United States Patent
Small et al.

(10) Patent No.: US 11,579,440 B2
(45) Date of Patent: Feb. 14, 2023

(54) FOCUS ASSESSMENT IN DYNAMICALLY FOCUSED LASER SYSTEM

(71) Applicant: NLIGHT, INC., Vancouver, WA (US)

(72) Inventors: Jay Small, Vancouver, WA (US); Ken Gross, Vancouver, WA (US)

(73) Assignee: NLIGHT, INC., Camas, WA (US)

( * ) Notice: Subject to any disclaimer, the term of this patent is extended or adjusted under 35 U.S.C. 154(b) by 298 days.

(21) Appl. No.: 16/817,450

(22) Filed: Mar. 12, 2020

(65) Prior Publication Data

US 2020/0292806 A1    Sep. 17, 2020

Related U.S. Application Data

(60) Provisional application No. 62/836,565, filed on Apr. 19, 2019, provisional application No. 62/818,624, filed on Mar. 14, 2019.

(51) Int. Cl.
G02B 26/08     (2006.01)
G02B 26/10     (2006.01)

(52) U.S. Cl.
CPC ......... G02B 26/101 (2013.01); G02B 26/105 (2013.01)

(58) Field of Classification Search
CPC ..... G02B 26/101; G02B 26/105; G02B 26/08
USPC ..................................................... 359/201.1
See application file for complete search history.

(56) References Cited

U.S. PATENT DOCUMENTS

| | | | |
|---|---|---|---|
| 5,832,415 A | 11/1998 | Wilkening | |
| 11,135,680 B2 | 10/2021 | Wuest | |
| 2004/0152233 A1 | 8/2004 | Nemets | |
| 2005/0067394 A1 | 3/2005 | Vaidyanathan et al. | |
| 2005/0205778 A1 | 9/2005 | Kitai et al. | |
| 2014/0327687 A1 | 11/2014 | Murakami | |
| 2015/0253487 A1 | 9/2015 | Nichol | |

(Continued)

FOREIGN PATENT DOCUMENTS

WO    2009054811 A1    4/2009

OTHER PUBLICATIONS

European Patent Office, International Search Report and Written Opinion of the International Search Report in International Application No. PCT/US2019/049215, dated Nov. 26, 2019, 12 pages.

(Continued)

*Primary Examiner* — Euncha P Cherry
(74) *Attorney, Agent, or Firm* — Schwabe Williamson & Wyatt (57) ABSTRACT

Some embodiments may include a method assessing whether a dynamic focus module in a three axis galvanometric scanning system (three-axis GSS) is associated with a focus calibration error. The method may include identifying a reference layer associated with a surface of the work piece and positive and negative offset distances each a difference distance above or below the reference layer, respectively, and selecting a target pattern based on the offset distances, wherein the pattern includes an individual line for each offset distance. The method may include commanding the three-axis GSS to draw the target pattern on the work piece, and then assessing whether the dynamic focus module is associated with the focus calibration error by correlating laser marking artifacts on the work piece to ones of the individual lines of the selected pattern. Other embodiments may be disclosed and/or claimed.

15 Claims, 6 Drawing Sheets

(56) References Cited

U.S. PATENT DOCUMENTS

| | | |
|---|---|---|
| 2015/0276783 A1 | 10/2015 | Palella et al. |
| 2015/0346483 A1 | 12/2015 | Ehrmann |
| 2018/0281067 A1 | 10/2018 | Small et al. |
| 2018/0326485 A1 | 11/2018 | Brown |
| 2019/0270161 A1 | 9/2019 | Allenberg-Rabe et al. |
| 2020/0078884 A1 | 3/2020 | Nie |
| 2021/0016394 A1* | 1/2021 | McCarthy ............ B23K 26/042 |

OTHER PUBLICATIONS

European Patent Office, International Preliminary Report on Patentability International Application No. PCT/US2019/049215, dated Aug. 6, 2021, 7 pages.

* cited by examiner

FOCUS ASSESSMENT IN DYNAMICALLY FOCUSED LASER SYSTEM

RELATED APPLICATIONS

This application is a non-provisional of and claims priority benefit to U.S. provisional application Ser. No. 62/836,565, filed on Apr. 19, 2019, and U.S. provisional application Ser. No. 62/818,624, filed Mar. 14, 2019, each of which is incorporated by reference herein in its entirety.

TECHNICAL FIELD

The present disclosure relates to three-axis galvanometric scanning systems.

BACKGROUND

Fiber lasers are widely used in industrial processes (e.g., cutting, welding, cladding, heat treatment, etc.) In some fiber lasers, the optical gain medium includes one or more active optical fibers with cores doped with rare-earth element(s). The rare-earth element(s) may be optically excited ("pumped") with light from one or more semiconductor laser sources.

Fiber laser systems may be used in laser marking machines. In one type of laser marking machine, both the laser source and the work piece are stationary and galvo (galvanometric) mirrors move the laser beam across a surface of the work piece.

In a 2D galvo system, an X-Y scan head module including two mirrors each rotatable by a galvanometric motor is located along a laser beam path between a laser device and a work piece to be marked, cut, engraved, or the like, by the laser beam. The first galvanometric motor may operate to rotate its mirror to reposition the laser beam along the work piece with respect to a first axis (the X direction). The second galvanometric motor may operate to rotate its mirror to reposition the laser beam along the work piece with respect to a second orthogonal axis (the Y direction).

A 3D galvo system is similar, except that a dynamic focus module may be used in addition to the X-Y scan head module (say, along the light path between the X-Y scan head module and the laser device). In the dynamic focus module, one or more lenses move relative to the laser device to move a point of focus of the laser beam along a third axis (the Z direction) that is orthogonal to the first and second axes, which enables three dimensional laser cutting of the work piece.

In both 2D and 3D GSSs, precision movement of the mirrors is needed to ensure that the laser marks the work piece as intended. A validation may be performed at any time to check the "aim" of the laser system (whether the laser system marks a selected location on the work piece in response to a command to mark that selected location). In a known validation test, a test point on the work piece is chosen, and then the GSS is commanded to draw lines intersecting at the chosen point, such as a X shaped marking feature or a + shaped marking feature. If the chosen point is not marked appropriately, e.g., the intersection of the X shaped or + shaped marking feature is discernably non-aligned with the chosen point, the system fails the validation test. A calibration process may be repeated on the system failing calibration validation.

Whereas a miscalibration of the mirrors may be exhibited by a laser mark that is "off target," a miscalibration of the dynamic focus module may be exhibited by poor mark quality. This is because the focus point that dynamically changes as the galvo points about the X-Y plane may be above or below and intended focus point, meaning the laser is not correctly focuses on the location to be processed (which may result in poor processing performance, and hence poor mark quality).

BRIEF DRAWINGS DESCRIPTION

The accompanying drawings, wherein like reference numerals represent like elements, are incorporated in and constitute a part of this specification and, together with the description, explain the advantages and principles of the presently disclosed technology.

DETAILED DESCRIPTION

Some embodiments may include a method assessing whether a dynamic focus module in a three axis galvanometric scanning system (three-axis GSS) is associated with a focus calibration error. The method may include identifying a reference layer associated with a surface of the work piece and positive and negative offset distances each a difference distance above or below the reference layer, respectively, and selecting a target pattern based on the offset distances, wherein the pattern includes an individual line for each offset distance. The method may include commanding the three-axis GSS to draw the target pattern on the work piece, and then assessing whether the dynamic focus module is associated with the focus calibration error by correlating laser marking artifacts on the work piece to ones of the individual lines of the selected pattern. Other embodiments may be disclosed and/or claimed.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items. The systems, apparatus, and methods described herein should not be construed as limiting in any way. Instead, the present disclosure is directed toward all novel and non-obvious features and aspects of the various disclosed embodiments, alone and in various combinations and sub-combinations with one another. The term "or" refers to "and/or," not "exclusive or" (unless specifically indicated).

The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation. Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus.

Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art. In some examples, values, procedures, or apparatus' are referred to as "lowest", "best", "minimum," or the like. It will be appreciated that such descriptions are intended to indicate that a selection among many used functional alternatives can be made, and such selections need not be better, smaller, or otherwise preferable to other selections.

Examples are described with reference to directions indicated as "above," "below," "upper," "lower," and the like. These terms are used for convenient description, but do not imply any particular spatial orientation.

Figure 1:
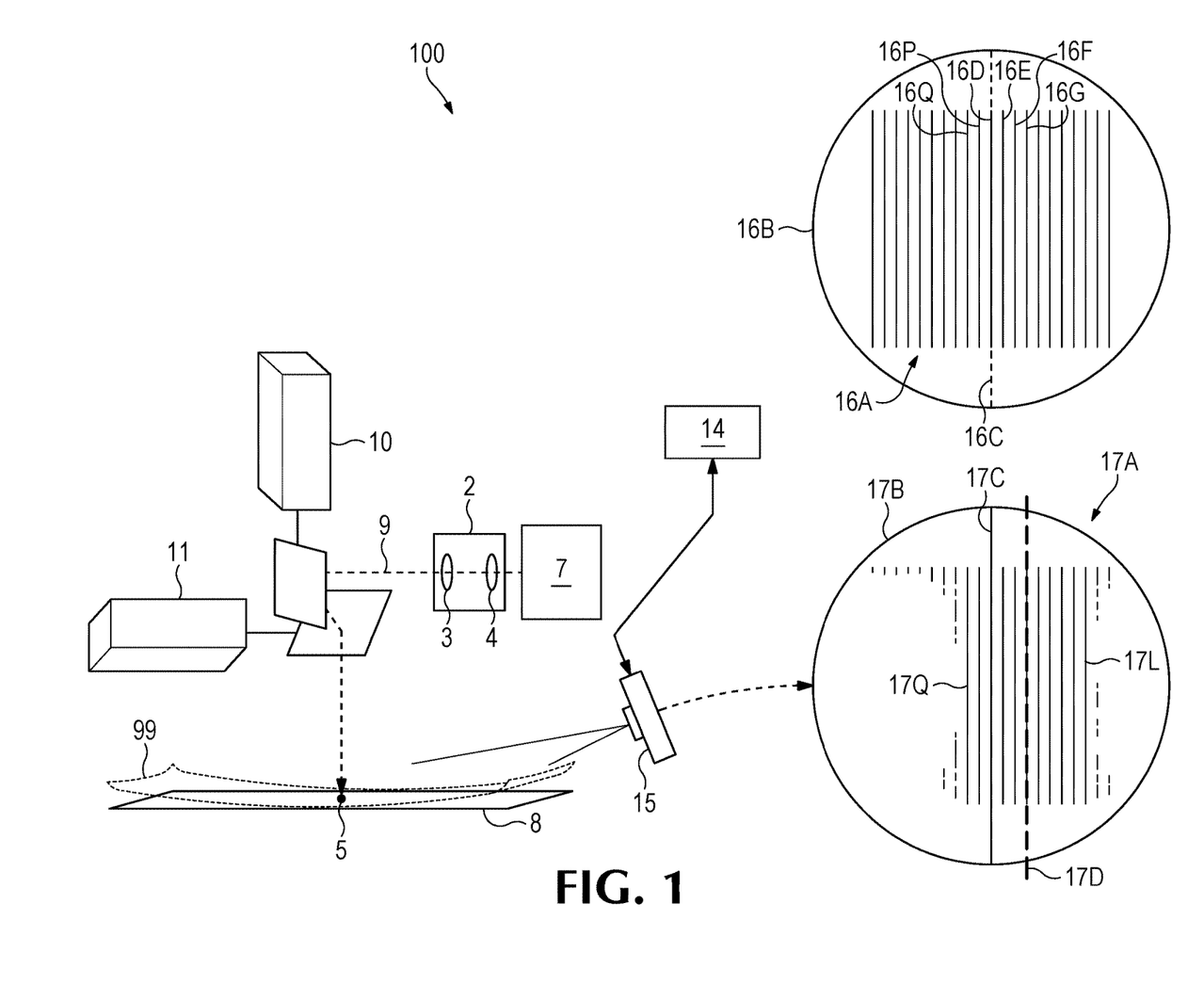
FIG. 1 illustrates a system for focus assessment in dynamically focused laser systems, according to some embodiments.

FIG. 1 illustrates a three-axis galvanometric scanning system (GSS) having a laser device 7 to generate a laser beam 9, an X-Y scan module to move the laser beam 9 relative to a work piece 8, and a dynamic focus module 2 to synchronize movement of at least one lens relative to the laser device 7 with positioning of the laser beam 9 by the X-Y scan head module. The X-Y scan module may include an X galvo motor 10 to drive rotation of a mirror and a Y galvo motor 11 to drive rotation of a mirror. The dynamic focus module 2 may include lens 3 and 4, and the dynamic focus module 2 may control movement of these lens 3 and 4 relative to each other and/or the laser device 7 to change a point of focus of the laser beam 9.

Also shown in FIG. 1 is an uncorrected layer of focus 99 in which a distance from the laser device 7 along the laser path the three axis GSS is the same for any point on the uncorrected layer of focus 99. The dynamic focus module 2, when calibrated correctly, may "flatten" this natural layer 99 to, say, a plane, for instance a plane aligned with the surface of the work piece 8.

Some methods to validate a focus calibration of the marking system may include commanding the marking system to draw non-overlapping relatively large grid patterns to be assessed by a person (e.g., 5×5 mm grid patterns or some other relatively large pattern discernable by a person). Each grid pattern may be drawn at different focus depth, and indicia indicating the value of the corresponding focus setting (e.g., z=0, z=−12, z=−24, etc.) for each grid pattern is included next to each grid pattern on the work piece. A person may inspect the work piece to compare the grid marks to decide which grid pattern exhibits the best quality, and then look up the value of the corresponding focus setting indicated by the indicia. This value may be compared to a threshold to validate the focus calibration of the marking system.

The amount of physical area on the work space required to drawing these non-overlapping patterns, and their indicia, is relatively large. Due to the relatively large area requirement, the drawing system must operate relatively far from a field center 5. This in turns requires marking to occur relatively far away from the localization being characterized (e.g., far away from the field center 5 in FIG. 1), which limits accuracy of the focus assessment.

Some embodiments disclosed herein use a smaller amount of physical area on the work space to acquire focus error data from which a calibration of dynamic focus module of a three axis GSS may be validated. In some embodiments, all necessary data for assessing the focus calibration may be generated by marking a work piece with the three axis GSS, and in some embodiments, by imaging the marked work piece using an imaging system (e.g., an optical Coordinate Measurement Machine (CMM) of the three axis GSS or some other imaging system). In embodiments utilizing an imaging system, this focus data may be generated by marking a plurality of features on a media that is sufficiently responsive to laser focus quality so as to be distinguishable by the imaging system.

The features, when directed to a pattern at focus levels above or below a target focus plane, may mark with poor contrast, poor edge quality, and/or discontinuities, which the imaging system can be trained to ignore. When the features' physical pattern locations are correlated with predefined relative focus change, the remaining features detected by the imaging system may yield adequate information for determining the plane of best focus.

In some embodiments, the features may be located in close proximity so as to situate entirely within a field of view of the imaging system. The features may be equally spaced on the media as shown in pattern 16A. The ellipse 16B may provide a geometry queue that the imaging system may use to determine field point location. Focus depth change between each feature in the pattern 16A may be the same so that the features patterned nearest the optical focus plan may lie approximately at the linear centroid of the group of the detected features. This centroid may be either calculated or chosen as a feature nearest center to represent the focus position current defined for the field point under test.

In some embodiments, straight vertical lines may be used as the focus marking features. Each vertical line may be laser marked at different and equally varied focus depth. A center line may be associated with zero focus offset. Lines to the right of the center line may be associated with focus layers situated above the work surface (e.g., in a first direction away from the surface of the work piece), and those to the left may be associated with focus layers situated below the work surface (e.g., in a second direction that is opposite the first direction). Such an embodiment is illustrated in FIG. 1, in which the three-axis GSS is commanded to draw a pattern 16A of straight lines. Line 16D of the pattern 16A is associated with a reference plane or some other reference layer associated with a surface of the work piece 8. Each additional line is associated with a positive or negative offset distance above or below the reference plane, respectively.

For instance line 16E may be associated with a positive offset distance, say, 250 µm in one example (e.g., a center point of a reference plane or other reference layer associated with pattern 16A may include a point 250 μm away from the center point 5 away from the surface of the work piece 8). Similarly, line 16F may be associated with a positive offset distance of +500 μm, and so on and so forth for the other equally spaced lines to the right of line 16F. Lines 16P and 16Q may be associated with negative offset distances of −250 μm and −500 μm, respectively. In addition to the pattern 16A, other markings such as a center line 16C on which the line 16D may be placed, and an ellipse 16B. These additional markings may be put on the work piece 8 before marking by the GSS, or may be added following the marking by the GSS by an imaging system to an image of the work piece 8 for analysis of that image.

The three-axis GSS may be commanded to draw the pattern 16A on the work piece 8. This may produce laser marking artifacts on the work piece 8 for at least some of the individual lines of the pattern 16A. The marked work piece 8 may be inspected by a person to estimate a location of the focus layer, or in some camera-aided evaluation embodiments, the system 100 may also include an imaging system (e.g., an optical CMM) including a camera 15 to image the work piece 8 following marking the work piece 8 with the laser beam 9. In either case, the generated assessment data (e.g., the laser marking artifacts on the work piece 8) may be inspected to estimate a location of the focus layer, and a calibration of the dynamic focus module 2 may be validated (or not) based on the location of the focus layer (e.g., validated if the focus layer is less than a threshold distance from the reference layer).

Image 17A illustrates an output by an imaging system in a camera-aided evaluation embodiment in an example in which the dynamic focus module 2 is not fully calibrated. In the image 17A, as mentioned previously, the center line 17C and the ellipse 17B may represent actual markings on the work piece 8 or data added by the imaging system for analysis of the laser marking artifacts. In the image 17A, markings corresponding to some of the lines of the pattern 16A exhibit poor contrast, poor edge quality, and/or discontinuities. For instance, all of the markings to the left of marking 17Q are poor quality, and also all of the markings to the right of marking 17L are marked with poor quality. In one embodiment, the scanning system may be programmed to ignore markings below a certain brightness (or exhibiting or not exhibiting some other predefined characteristic), which could include those poor quality markings.

In contrast to other systems that require a person to compare a quality of grid patterns to decide which grid pattern exhibits the least contrast, poor edge quality, and/or discontinuities, with the image 17A no decision requiring the "best" marking is required. A person (or the imaging system) need only find a middle of the region including markings not exhibiting a threshold contrast, poor edge quality, and/or discontinuities. It is much easier to identify that markings including marking 17Q and 17L and those markings in-between do not exhibit the same degree of poor contrast, poor edge quality, and/or discontinuities as the other markings, and then identify a middle of the marking region (a geometric problem) defined by markings 17Q and 17L.

A middle 17D of the marking region, which may or may not fall on one of the markings, may identify a best focus layer. In other words, the dynamic focus module 2 is in best focus above the surface of the work piece 8. In this case, since 17D falls on a marking for line 16G of the pattern 16A, associated with a positive offset of +750 μm, the best focus layer is about 750 μm above the surface of the work piece 8. This estimate may be used for any purpose—in some embodiments, the estimate may be used to validate a calibration of the dynamic focus module 2 (e.g., not calibrated if the estimate is greater than a threshold), and record that validation, say, in a database or even a sticker placed on the three-axis GSS. In some embodiments, the estimate may be used to recalibrate the dynamic focus module 2, but this is not required.

In other embodiments, instead of marking straight lines of equal spacing, in some embodiments the GSS may be commanded to draw arbitrary shapes, such as ellipses or polygons, patterned at regular intervals or some other defined way that may correlate the location of the shapes to an assigned focus depth. In one example, the shapes may be ellipses of different sizes (or polygons of different sizes) centered around a same center point. In this or any other example a complete focus assessment at a field point may be generated in a single image frame of an imaging system.

Figure 2:
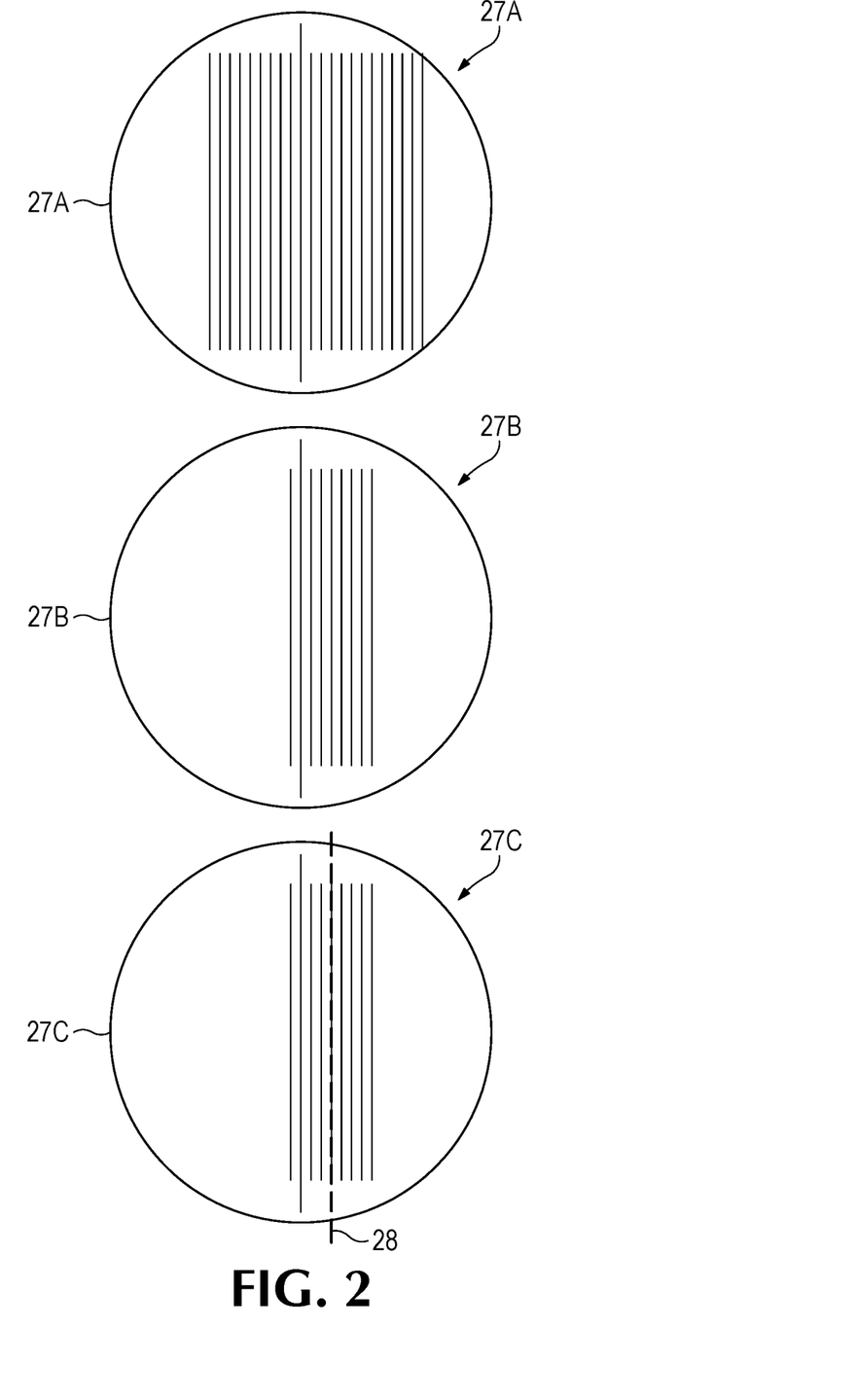
FIG. 2 illustrates images of laser marking artifacts that may be generated for a straight line pattern in embodiments including imaging systems, according to various embodiments.

FIG. 2 illustrates images 27A-C of laser marking artifacts that may be generated for a straight line pattern in embodiments including imaging systems, according to various embodiments. Image 27A may be created by imaging the work piece 8 (FIG. 1) following the operating of the three-axis GSS.

Referring again to FIG. 1, the system 100 may also include one or more computing devices 14 each including at least one processor configured to execute instructions stored in a memory. The computing device(s) 14 may be in communication with any component of the system 100 to perform any focus assessment operations described herein. In embodiments including the imaging system, at least one of the computing devices may be a computing device of the imaging system, in communication with the camera 15 and including a processor programmed to perform any imaging system process described herein. Referring now to FIG. 2, the processor may be programmed to filter the image 27A using any parameter associated with imaging system to generate image 27B. In the present example, the parameter comprises a brightness threshold—features from image 27A not greater than the brightness threshold may be removed. The processor may recognize laser scoring features from the remaining lines of image 27B.

To estimate a distance between the focus layer and the reference layer, the processor may identify a middle of a region of the laser scoring features in image 27B. This is illustrated in image 27C where the processor has identified a center line 28. Where the center line 28 falls on one of the lines from the image 27B (e.g., aligns with a single laser scoring feature in the case of an equal number of laser scoring features), the distance may be the corresponding offset distance for that single laser scoring feature.

On the other hand, the center line 28 may fall between laser scoring features in the case of an odd number of laser scoring features. There are a number of possible ways the processor may be programmed to estimate the distance in these cases. For example, the processor may select one of the laser scoring features closest to a first edge of the image 27G, select one of the laser scoring features closest to a second opposite edge of the image 27B, and calculate an average of corresponding offset distances for the selected laser scoring features. The processor may estimate a distance between the focus layer and the reference layer using the average.

Figure 3:
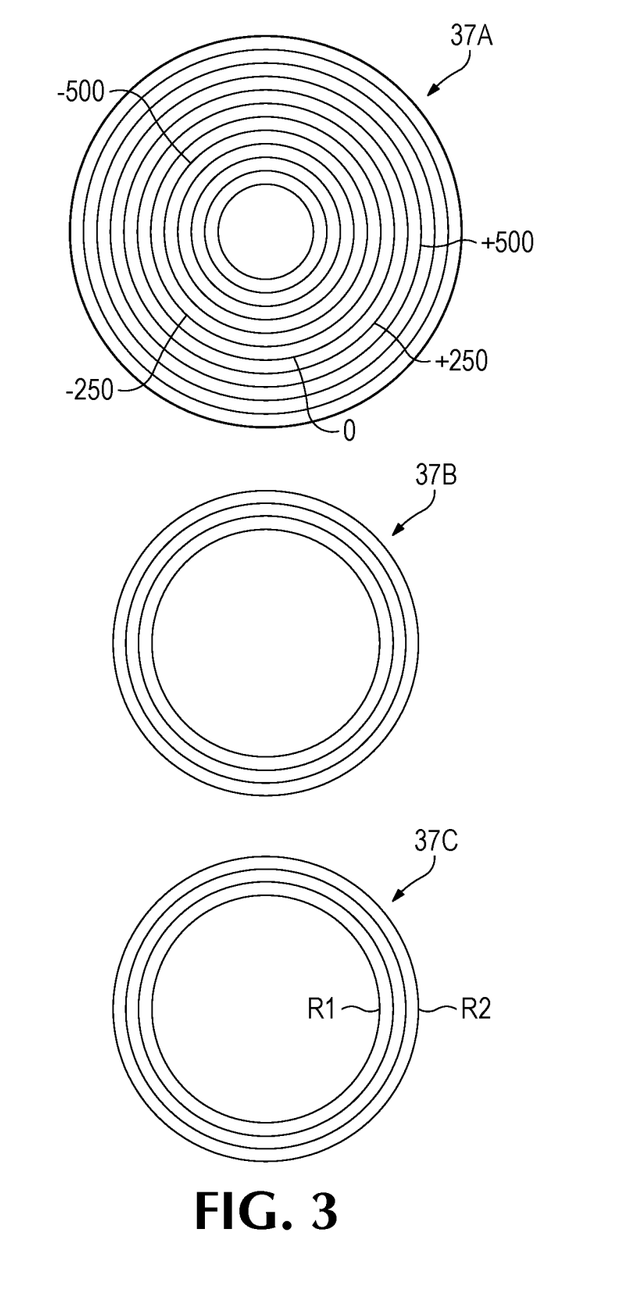
FIG. 3 illustrates images of laser marking artifacts that may be generated for concentric ellipses or concentric polygon patterns in embodiments including imaging systems, according to various embodiments.

FIG. 3 illustrates images 37A-C of laser marking artifacts that may be generated for concentric ellipses or concentric polygon patterns in embodiments including imaging systems, according to various embodiments. Image 37A may be created by imaging the work piece 8 (FIG. 1) following the operating of the three-axis GSS. In this example, each equally spaced ring corresponds to a different offset distance, with the outermost ring being corresponding to a furthest positive offset distance and an innermost ring corresponding to a furthest negative offset distance. Similar to the filtering of image 27A (FIG. 2), the processor may filter the image 37A to generate image 37B.

To estimate a distance between the focus layer and the reference layer, the processor may identify a middle of a region of the laser scoring features of image 37B. Where a center line falls on one of the rings from image 37B (e.g., aligns with a single laser scoring feature in the case of an equal number of laser scoring features, not shown), the distance may be the corresponding offset distance of that ring.

On the other hand, the center line 28 may fall between laser scoring images in the case of an odd number of laser scoring images, as illustrated in image 37C. There are a number of possible ways the processor may be programmed to estimate the distance in these cases. For example, the processor may select an outermost one of the laser scoring features (R2), select an innermost one of the laser scoring features (R1), and calculate an average of corresponding offset distances for the selected laser scoring features. The processor may estimate a distance between the focus layer and the reference layer using the average.

Figure 4:
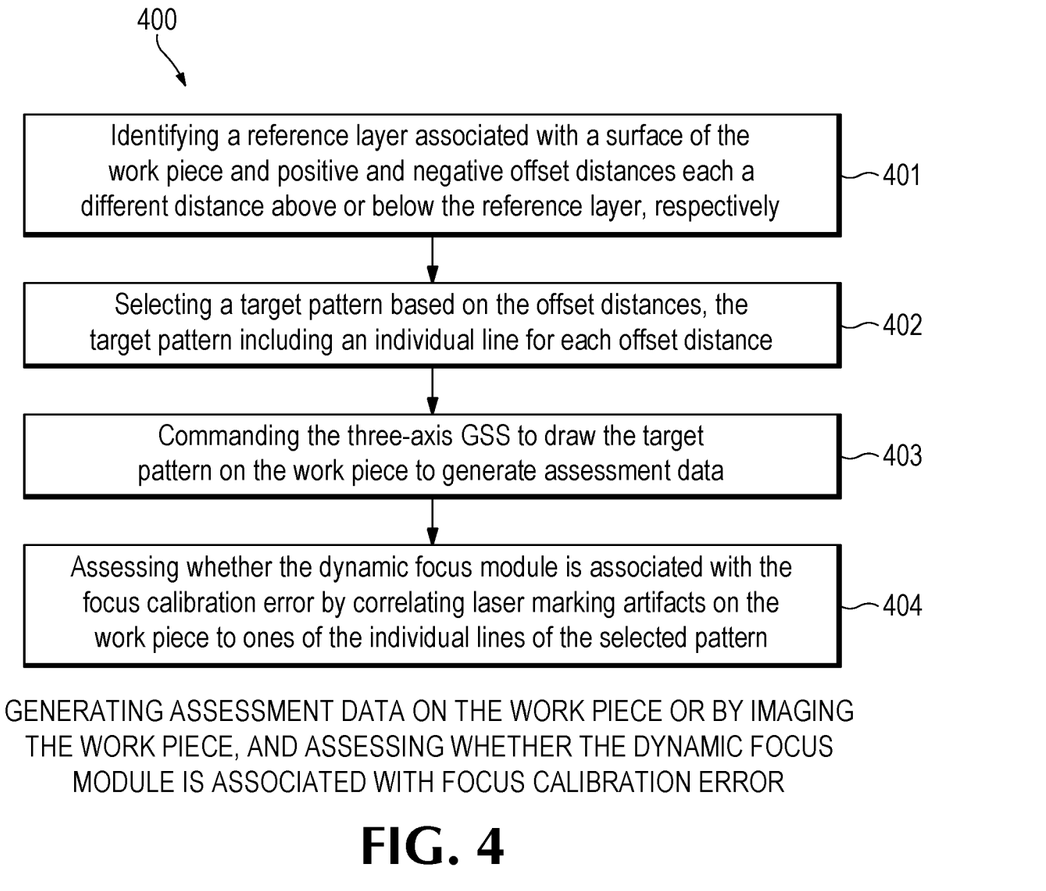
FIG. 4 illustrates a process for generating assessment data on a work piece or by imaging the work piece, assessing whether the dynamic focus module is associated with focus calibration error, according to various embodiments.

FIG. 4 illustrates a process 400 for generating assessment data on a work piece or by imaging the work piece, and assessing whether the dynamic focus module is associated with focus calibration error, according to various embodiments. In block 401, a reference layer associated with a surface of the work piece and positive and negative offset distances each a different distance above or below the reference layer, respectively, are identified. In block 402, a target pattern based on these offset distances is identified. The target pattern may include an individual line for each of the individual offset distances. The individual lines may be straight lines similar to the example of FIG. 2, or the individual lines may be concentric geometries, such as ellipses (similar to the example of FIG. 3), arcs, or polygons.

In block 403, the three-axis GSS may be commanded to draw the target pattern on the work piece to generate assessment data. The assessment data may include laser artifacts on the surface of the work piece and/or images produced therefrom by an imaging system.

In block 404, an assessment of whether the dynamic focus module is associated with the focus calibration error is made by correlating laser marking artifacts on the work piece to ones of the individual lines of the selected pattern. An imaging system may be used for this correlation, in some examples, but this is not required (in some embodiments, a person may correlate laser marking artifacts on the surface of the work piece to ones of the individual lines of the selected pattern).

Figure 5:
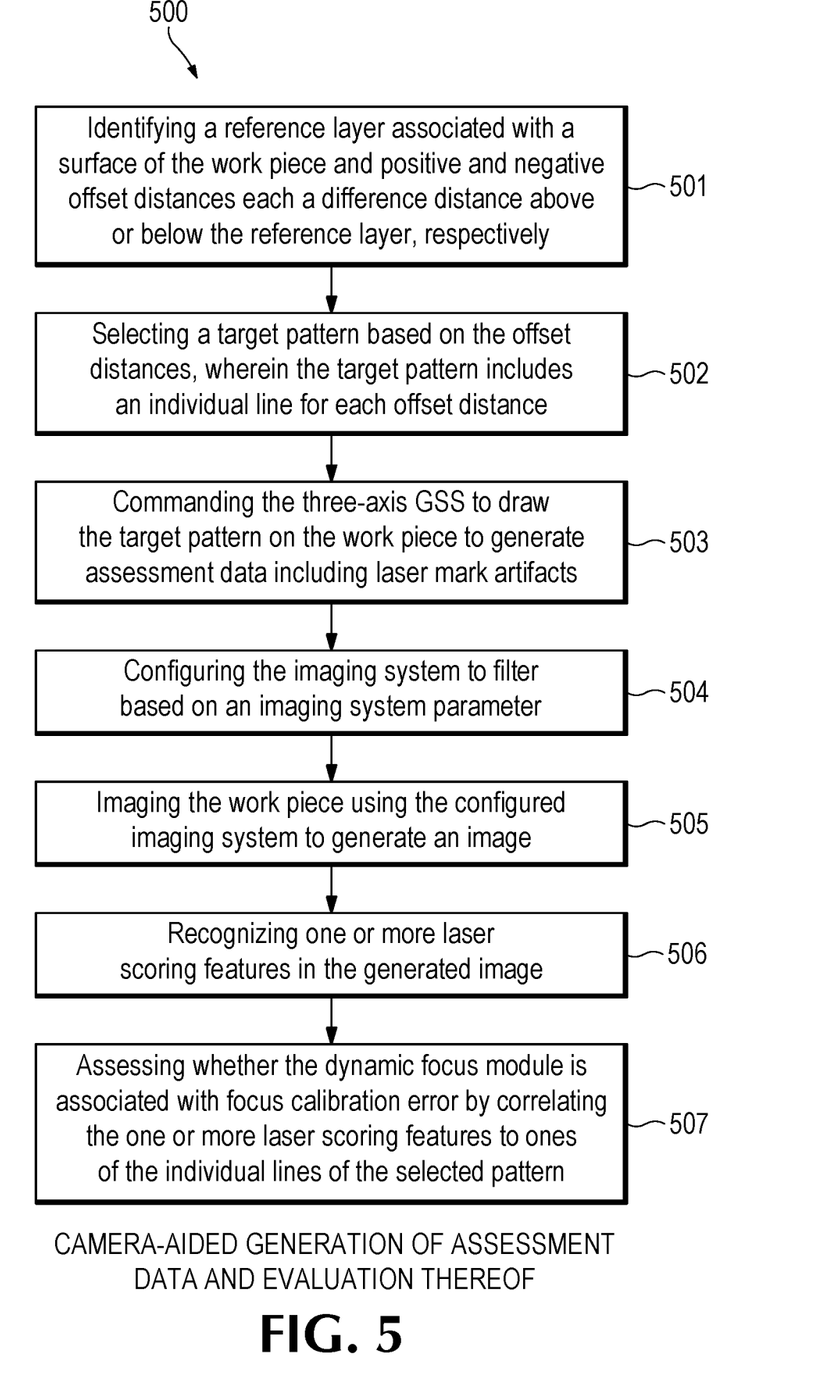
FIG. 5 illustrates a process of camera-aided generation of assessment data and evaluation thereof, according to various embodiments.

FIG. 5 illustrates a process 500 of camera-aided generation of assessment data and evaluation thereof, according to various embodiments. In block 501, a reference layer associated with a surface of the work piece and positive and negative offset distances each a different distance above or below the reference layer, respectively, are identified. In block 502, a target pattern based on these offset distances is identified. The target pattern may include an individual line for each of the individual offset distances. The individual lines may be straight lines similar to the example of FIG. 2, or the individual lines may be concentric geometries, such as ellipses (similar to the example of FIG. 3), arcs, or polygons.

In block 503, the three-axis GSS may be commanded to draw the target pattern on the work piece to generate assessment data including laser mark artifacts. In block 504, the imaging system may be configured to filter based on an imaging system parameter. In one example, the imaging system may be configured to ignore features having a brightness less than a brightness threshold.

In block 505, the work piece may be imaged using the configured imaging system to generate an image. In the image, based on the filtering, at least one of the laser mark artifacts from the surface of the work piece may not be represented in the image.

In block 506, a processor of the imaging system may recognize one or more laser scoring features in the generated image. In block 507, the processor may assess whether the dynamic focus module is associated with focus calibration error by correlating the one or more laser scoring features to ones of the individual lines of the selected pattern.

Figure 6:
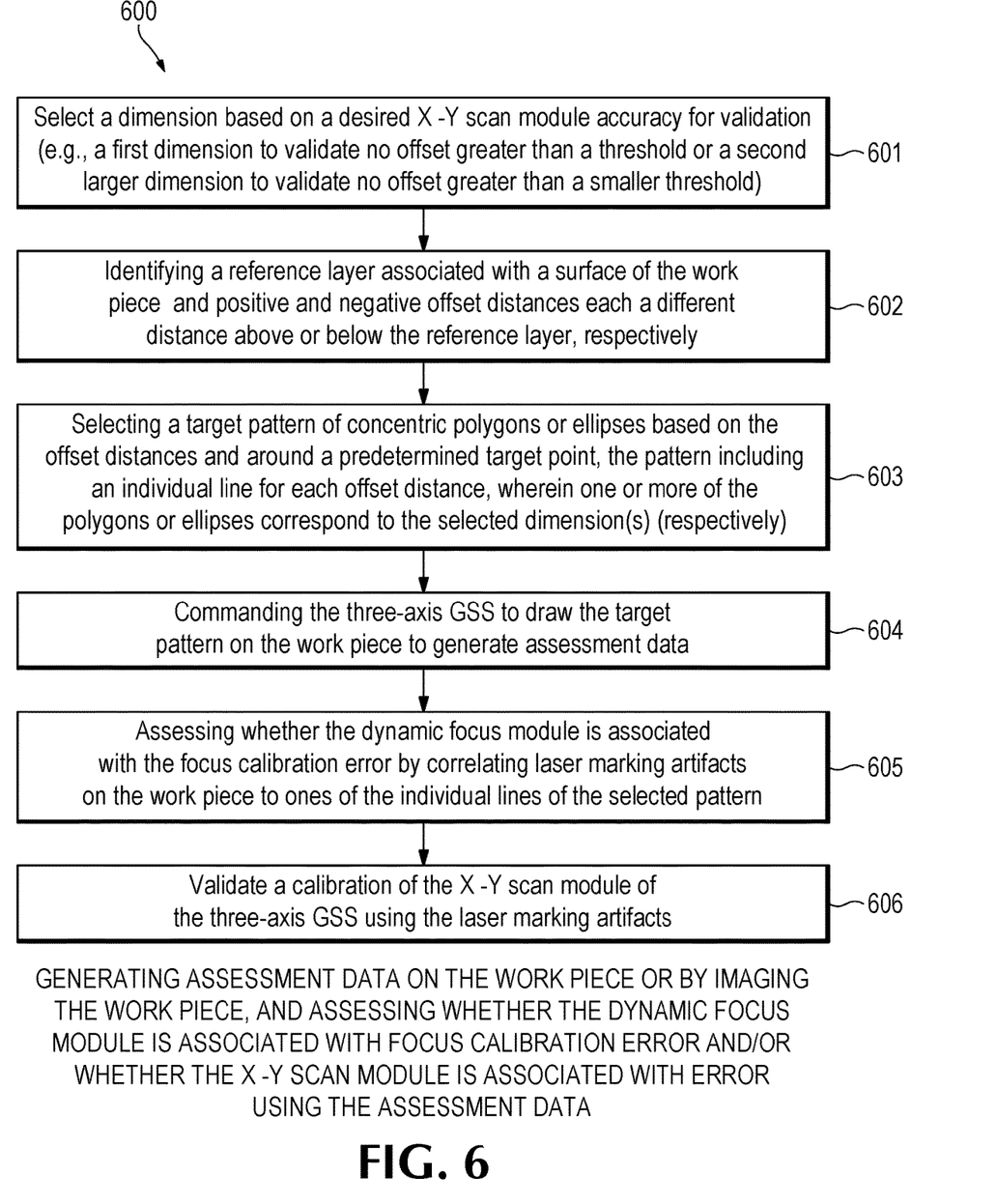
FIG. 6 illustrates a process of for generating assessment data on a work piece or by imaging the work piece, assessing whether the dynamic focus module is associated with focus calibration error and/or whether the X-Y scan module is associated with error using the assessment data, according to various embodiments.

FIG. 6 illustrates a process 600 of generating assessment data on a work piece or by imaging the work piece, and assessing whether the dynamic focus module is associated with focus calibration error and/or whether the X-Y scan module is associated with error using the assessment data, according to various embodiments. Co-pending U.S. non-provisional application Ser. No. 16/817,357, filed on Mar. 12, 2020 describes validating a calibration of an X-Y scan module (such as the X-Y module illustrated in FIG. 1 of the present application) by drawing one or more polygons or ellipses around a predetermined test point. Briefly, some embodiments in the '624 provisional include commanding the laser system to mark one or more geometric features centered on a test point. By "centered on" the test point, we mean around the test point—in our approach there is no attempt to mark the test point itself (in contrast to some other calibration validation approaches that attempt to mark the test point). To detect large calibration errors, small polygons or ellipses may be chosen, e.g., in the case of small geometrically perfect circles (which are on example of ellipses), say, 1 mm in diameter, so that the features may be visible in an imaging system (e.g., an optical CMM) as the imaging system slews to each location in search of the feature. That is to say, in some embodiments, the dimension of the small geometric feature may be selected based on predefined characteristics of the imaging system, to optimize detection/location by the imaging system. Co-pending U.S. nonprovisional application Ser. No. 16/817,357, filed on Mar. 12, 2020 is incorporated by reference herein.

In some embodiments, assessment data may be generated on a work piece where the assessment data may be utilized for assessment of both a calibration of the dynamic scan module and a calibration of the X-Y scan module using process 600 of FIG. 6. This can be done particularly where concentric ellipses are used, or concentric geometries in which the polygons have n-order rotational symmetry in which n is greater than one similar to geometries described in the '624 provisional. The geometry of such a laser mark may identically repeat its shape when rotated by 1/nth of 360 degrees. The geometric center of the laser mark may be unchanged with the scale of the polygon.

In block 601, at least one dimension based on an X-Y scan module accuracy for validation may be selected. In block 602, a reference layer associated with a surface of the work piece and positive and negative offset distances each a different distance above or below the reference layer, respectively, are identified.

In block 603, a target pattern of concentric polygons or ellipses based on these offset distances and around a predetermined target point is identified. The target pattern may include an individual line for each of the individual offset distances. Also, one or more of the polygons or ellipses may correspond to the selected dimension(s), respectively.

In block 604, the three-axis GSS may be commanded to draw the target pattern on a work piece to generate the assessment data. In block 605, an assessment of whether the dynamic focus module is associated with the focus calibration error may be made by correlating laser marking artifacts on the work piece to ones of the individual lines of the selected pattern. In block 606, a validation of the calibration of the X-Y scan module of the three-axis GSS may also be made using the laser marking artifacts. For instance, an offset between a common center of the polygons or ellipses and the predetermined test point may be calculated, and this offset may be used to evaluate the calibration of the X-Y scan module.

Most of the equipment discussed above comprises hardware and associated software. For example, the typical imaging system and/or three-axis galvanometric system is likely to include one or more processors and software executable on those processors to carry out the operations described. We use the term software herein in its commonly understood sense to refer to programs or routines (subroutines, objects, plug-ins, etc.), as well as data, usable by a machine or processor. As is well known, computer programs generally comprise instructions that are stored in machine-readable or computer-readable storage media. Some embodiments of the present invention may include executable programs or instructions that are stored in machine-readable or computer-readable storage media, such as a digital memory. We do not imply that a "computer" in the conventional sense is required in any particular embodiment. For example, various processors, embedded or otherwise, may be used in equipment such as the components described herein.

Memory for storing software again is well known. In some embodiments, memory associated with a given processor may be stored in the same physical device as the processor ("on-board" memory); for example, RAM or FLASH memory disposed within an integrated circuit microprocessor or the like. In other examples, the memory comprises an independent device, such as an external disk drive, storage array, or portable FLASH key fob. In such cases, the memory becomes "associated" with the digital processor when the two are operatively coupled together, or in communication with each other, for example by an I/O port, network connection, etc. such that the processor can read a file stored on the memory. Associated memory may be "read only" by design (ROM) or by virtue of permission settings, or not. Other examples include but are not limited to WORM, EPROM, EEPROM, FLASH, etc. Those technologies often are implemented in solid state semiconductor devices. Other memories may comprise moving parts, such as a conventional rotating disk drive. All such memories are "machine readable" or "computer-readable" and may be used to store executable instructions for implementing the functions described herein.

A "software product" refers to a memory device in which a series of executable instructions are stored in a machine-readable form so that a suitable machine or processor, with appropriate access to the software product, can execute the instructions to carry out a process implemented by the instructions. Software products are sometimes used to distribute software. Any type of machine-readable memory, including without limitation those summarized above, may be used to make a software product. That said, it is also known that software can be distributed via electronic transmission ("download"), in which case there typically will be a corresponding software product at the transmitting end of the transmission, or the receiving end, or both.

In view of the many possible embodiments to which the principles of the disclosed technology may be applied, it should be recognized that the illustrated embodiments are only preferred examples and should not be taken as limiting the scope of the disclosure. We claim as our invention all that comes within the scope and spirit of the appended claims.

The invention claimed is:

1. A method for use in a three-axis galvanometric scanning system (three-axis GSS) having a laser device to generate a laser beam, an X-Y scan head module to position the laser beam on a work piece, and a dynamic focus module to synchronize movement of a lens relative to the laser device with positioning of the laser beam by the X-Y scan head module, the method including assessing whether the dynamic focus module is associated with a focus calibration error, the method further comprising:
   identifying a reference layer associated with a surface of the work piece, and positive and negative offset distances each a different distance above or below the reference layer, respectively;
   selecting a target pattern based on the offset distances, wherein the selected pattern includes an individual line for each offset distance; and
   commanding the three-axis GSS to draw the selected pattern on the work piece, wherein during operation of the three-axis GSS based on the commanding the dynamic focus module controls movement of the lens to maintain focus of the laser beam in a focus layer;
   wherein the assessing whether the dynamic focus module is associated with the focus calibration error is based on correlating laser marking artifacts on the work piece to ones of the individual lines of the selected pattern.

2. The method of claim 1, further comprising estimating a distance between the focus layer and the reference layer using the offset distances of the correlated individual lines.

3. The method of claim 2, wherein estimating the distance between the focus layer and the reference layer using the offset distances of the correlated individual lines further comprises identifying a median one of the offset distances of the correlated individual lines or averaging more than one of the offset distances.

4. The method of claim 3, wherein averaging the more than one of the offset distances comprises averaging the most distant ones of the offset distances.

5. The method of claim 1, wherein the selected pattern comprises concentric geometries or individual lines of the selected pattern comprises parallel individual lines.

6. The method of claim 5, wherein the concentric geometries comprise concentric ellipses or arcs, and wherein each individual line of the selected pattern defines a corresponding one of the concentric ellipses or arcs.

7. The method of claim 5, wherein the concentric geometries comprises concentric polygons.

8. The method of claim 1, wherein correlating laser marking artifacts on the work piece to ones of the individual lines of the selected pattern further comprises filtering the laser marking artifacts based on a parameter of an imaging system or ranking the laser marking artifacts based on comparative evaluation.

9. The method of claim 8, wherein filtering the laser marking artifacts based on a parameter of an imaging system further comprises:

configuring the imaging system to ignore brightness below a brightness threshold, the imaging system including a camera and a processor to control the camera;

following the operation of the three-axis GSS and the configuring the imaging system, imaging the work piece using the imaging system to generate an image, wherein at least one of the laser mark artifacts is not represented in the generated image; and recognizing one or more laser scoring features in the generated image using the processor;

wherein correlating laser marking artifacts on the work piece to ones of the individual lines of the selected pattern is by correlating the one or more laser scoring features to the ones of the individual lines of the selected pattern.

10. The method of claim 9, wherein the imaging system comprises an integrated optical coordinate measurement machine (CMM) of the three-axis GSS.

11. The method of claim 9, wherein the processor is configured to estimate a distance between the focus layer and the reference layer using the offset distances of the ones of the individual lines of the selected pattern.

12. The method of claim 9, wherein the processor is configured to:

select an outermost one of the laser scoring features or one of the laser scoring features closest to a first edge of the generated image;

select an innermost one of the laser scoring features or one of the laser scoring features closest to a second opposite edge of the generated image; and calculate an average of ones of the offset distances that are correlated with the selected laser scoring features; and estimate a distance between the focus layer and the reference layer using the average.

13. The method of claim 8, wherein ranking the laser marking artifacts based on comparative evaluation comprises:

displaying a computer generated image of the work piece at a location remote from a location of the three-axis GSS, wherein the computer generated image is transmitted over an electronic network, wherein the displayed computer generated image includes representations of the laser mark artifacts; and manually inspecting the representations of the laser mark artifacts based on edge quality comparisons of the representations.

14. The method of claim 8, wherein ranking the laser marking artifacts based on comparative evaluation comprises:

directly manually inspecting the work piece following the operation of the three-axis GSS based on edge quality comparisons of the laser mark artifacts.

15. The method of claim 1, wherein the work piece comprises a planar surface, and wherein the reference layer comprises a reference plane associated with the planar surface.

* * * * *